United States Patent
Geraud (10) Patent No.: US 7,370,059 B2
(45) Date of Patent: May 6, 2008

(54) MODEL OF DOCUMENTS AND METHOD FOR AUTOMATICALLY CLASSIFYING A DOCUMENT

(75) Inventor: Thierry Geraud, Paris (FR)

(73) Assignee: EMC Corporation, Hopkinton, MA (US)

( * ) Notice: Subject to any disclaimer, the term of this patent is extended or adjusted under 35 U.S.C. 154(b) by 572 days.

(21) Appl. No.: 10/852,969

(22) Filed: May 25, 2004

(65) Prior Publication Data

US 2005/0223313 A1   Oct. 6, 2005

(30) Foreign Application Priority Data

Mar. 30, 2004   (EP)   ................... 04290834

(51) Int. Cl.
    *G06F 7/00*     (2006.01)
    *G06F 17/00*    (2006.01)
    *G06K 9/62*     (2006.01)
(52) U.S. Cl. .................. 707/102; 707/100; 707/103 R; 382/224
(58) Field of Classification Search ................ 382/224; 707/100, 102, 103 R
    See application file for complete search history.

(56) References Cited

U.S. PATENT DOCUMENTS

| | | | |
|---|---|---|---|
| 5,159,667 A * | 10/1992 | Borrey et al. ............... | 715/500 |
| 5,293,429 A | 3/1994 | Pizano et al. ............... | 382/202 |
| 5,867,595 A | 2/1999 | Cymbalski .................. | 382/192 |
| 5,937,084 A * | 8/1999 | Crabtree et al. ............ | 382/137 |
| 6,542,635 B1 * | 4/2003 | Hu et al. .................... | 382/173 |

FOREIGN PATENT DOCUMENTS

EP       0 809 219 A2    11/1997

* cited by examiner

*Primary Examiner*—Don Wong
*Assistant Examiner*—Cheryl M Shechtman
(74) *Attorney, Agent, or Firm*—Workman Nydegger (57) ABSTRACT

A method for automatically creating a model of documents representing a class of documents. The method includes the steps of providing a plurality of documents separated into different classes; and determining at least one potential identifying tag within one document belonging to one class. The identifying tag may be defined by at least its graphical content, size and location within the document. The method also includes checking whether the potential identifying tag is included within at least a document of the class and creating a model of documents related to said one class, the model including the selected identifying tags.

12 Claims, 3 Drawing Sheets

MODEL OF DOCUMENTS AND METHOD FOR AUTOMATICALLY CLASSIFYING A DOCUMENT

FIELD OF THE INVENTION

The invention relates to the field of document image processing, and more specifically to document image classification. We refer to document image as a document that has been digitalized by any means.

In various applications, it is desirable to classify documents by their type, e.g., business letters, invoice, fax cover sheet, and by their origin, e.g., customer, subscriber, etc.

Obviously, documents can be classified as belonging to one identifiable class. We define a class as being a set of documents of a given type, each document including a structure and/or contents similar to the other documents of the class and different from the documents of any other class. Any pair of documents taken from the same class should have at least some regions similar to each other and any pair of documents taken from two different classes should have at least some regions dissimilar to each other.

U.S. Pat. No. 6,542,635 discloses a method wherein a document to be classified is segmented into blocks of data, for instance by using a pattern or optical character recognition (ORC) applied to part or the entire document. A vector of characteristics is created, representing a segment or the entire imaged document. A classification algorithm is then applied to the vector of characteristics to determine to which class the document belongs.

Various classification algorithms are known, such as the K-mean method, the fuzzy C-mean method, and neuronal network based approaches. However, automatic classification of document images requires high processing capacity.

Some known methods perform document classification further to a learning step. Models are created to define different classes of documents. Documents to be classified are then assigned to a class by comparing the document to be classified with the different models. Such models of documents are commonly created by an operator and such supervised operation is time consuming and expensive.

SUMMARY

According to the invention a new method of classification is provided that can increase the rate of document processing and suppress classification system operator intervention.

Moreover, the method according to the invention remains reliable and efficient when the number of classes increases.

According to the invention, models of documents are created starting from a sample of classified documents. Such models are representative of the contents of all the documents of a given class while including less data to be processed.

When such models of documents are created, an incoming document to be classified is compared to the models and assigned to a class or rejected.

Therefore, the invention provides a specific way to model a class of documents and a method for automatically creating such models of documents.

Furthermore, the invention provides a method for assigning a class to a document using models of documents according to the invention.

The methods of the present invention are preferably computer-implemented.

In particular, the invention concerns a model of documents including at least one identifying tag, each identifying tag being defined by at least its graphical content, size and location within the document.

According to a feature, the object to surface ratio of the graphical content of the identifying tag is substantially equal to 0,5.

According to another feature, the size of the identifying tag is less or equal to 5% of the document size.

The invention also concerns a method for automatically creating a model of documents representing a class of documents, the method comprising the steps of:

a) providing a plurality of documents separated into different classes;

b) determining at least one potential identifying tag within one document belonging to one class, said identifying tag being defined by at least its graphical content, size and location within the document;

c) checking whether said potential identifying tag is included within at least a document of said one class;

d) if said step c) is positive, selecting said identifying tag;

d') if step c) is negative, rejecting said potential identifying tag and repeating steps b) and c);

e) creating a model of documents related to said one class including said selected identifying tag.

The method according to the invention may further comprise the steps of:

f) checking whether said potential identifying tag is included within at least a document of another class;

g) if step f) is negative, selecting said identifying tag;

g') if step f) is positive, rejecting said potential identifying tag and repeating steps b) and c).

The method is repeated for each class of documents provided.

According to one feature, step b) comprises the steps of:

$b_1$) selecting a working window in said one document;

$b_2$) calculating an object to surface ratio for said working window;

$b_3$) if said ratio lies within predetermined values, selecting the region of said working window as a potential identifying tag.

According to one feature, steps $b_1$) to $b_3$) are repeated by shifting the working window to scan the document. A given portion of the document may be excluded from the searching of an identifying tag.

According to one feature, steps c) and f) comprise the step of calculating a correlation function between the potential identifying tag and a region of said document corresponding to the size and location of said identifying tag.

The invention also concerns a computer system for creating a model of documents according to the method of the invention.

The invention also concerns a method for automatically classifying a document comprising the steps of:

a') providing a plurality of models of documents according to the invention, each model of documents being related to a given class;

b') comparing a document to be classified with at least one model of documents;

c') if said document to be classified matches with said one model of documents, assigning said document into said corresponding class;

d') if said document to be classified doesn't match with any model of documents, rejecting said document.

According to one feature, step b') includes the step of calculating a correlation function between at least one identifying tag of the model of documents and a region of the document to be classified corresponding to the size and location of said identifying tag.

According to one feature, step c') includes the steps of:
comparing the correlation function results for each model of documents provided at step a');
assigning the document to be classified to the class corresponding to the model of documents providing the correlation result closest to a predetermined value The invention also concerns a computer system for classifying a document according to the method of the invention.

BRIEF DESCRIPTION OF THE DRAWINGS

Other characteristics and advantages of the invention will appear on reading the following detailed description of the embodiments of the invention, given solely as an example, and with reference to the drawings which show:

FIG. 1b is a schematic view of a model representing the class of the document of FIG. 1a;

DETAILED DESCRIPTION

The invention proposes creating models of documents to represent classes of documents and that can be further used for document classification.

According to the invention, a model of documents includes at least one identifying tag or marker. We refer to an identifying tag as being a region of document representing said document. An identifying tag is defined by at least its graphical content, its size and location within the document.

Figure 1A:
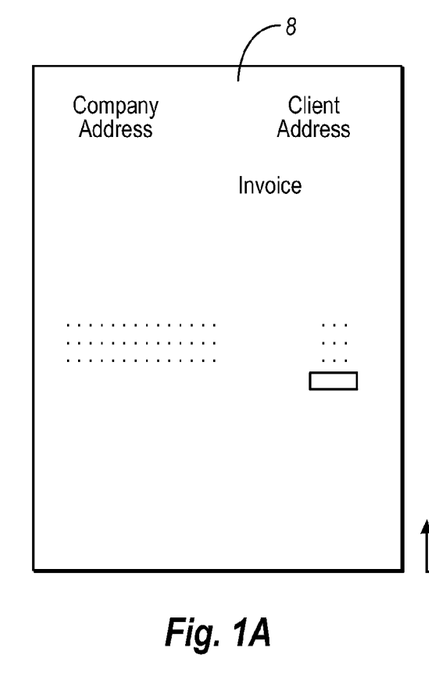
FIG. 1a is a schematic view of a document to be classified.
Figure 1B:
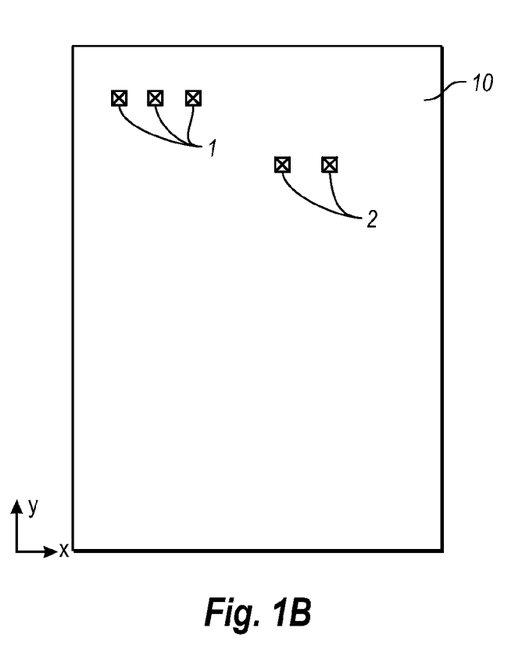

FIGS. 1a and 1b show respectively a document 8 and the corresponding model of documents 10 according to the invention.

As shown on FIG. 1b, the model 10 includes a plurality of identifying tags 1, 2. However, one identifying tag may be enough to define a model of documents and up to several dozens identifying tags associated to one model can be handled without too much slowing down processing. Preferably, an average of 5 to 10 identifying tags is compliant to define most models of documents.

In the example of FIG. 1, the identifying tags 1, 2 respectively represent the originating company of the document 8, with its name, address and possibly with a logo, and the type of document 8 as being an invoice. The model 10 should therefore be representative of any document having the same originating company and being an invoice.

An identifying tag has a predetermined size, preferably limited to up to 5% of the document size, and preferably less than 1% of the document size. An identifying tag is located in a specific region of the document, e.g., at the top left, on a bottom line, etc. Defining several small sized tags spread over a given portion of document is preferred to a single bigger tag located on the same portion of document.

The identifying tag is also defined by its graphical contents. A region of the document selected as an identifying tag preferably has an object-to-surface ratio substantially equal to 0,5. This ratio ensures that the identifying tag includes representative data that can be computed to further compare documents.

As each document is digitalized, an identifying tag is therefore a set of pixels that can be processed independently from the whole document.

Each identifying tag 1, 2 has a given graphical content D1, D2, which is data related to the values of the pixels in the specific region of the tag. Each tag 1, 2 also has a given size, S1, S2, which is the number of lines and columns of pixels in the specific region of the tag. Each tag also has a given location within the document, for instance defined by the upper left coordinates, (x1, y1), (x2, y2) of the specific region of the tag.

A model of documents according to the invention is defined by one or more identifying tags as just described.

Figure 2:
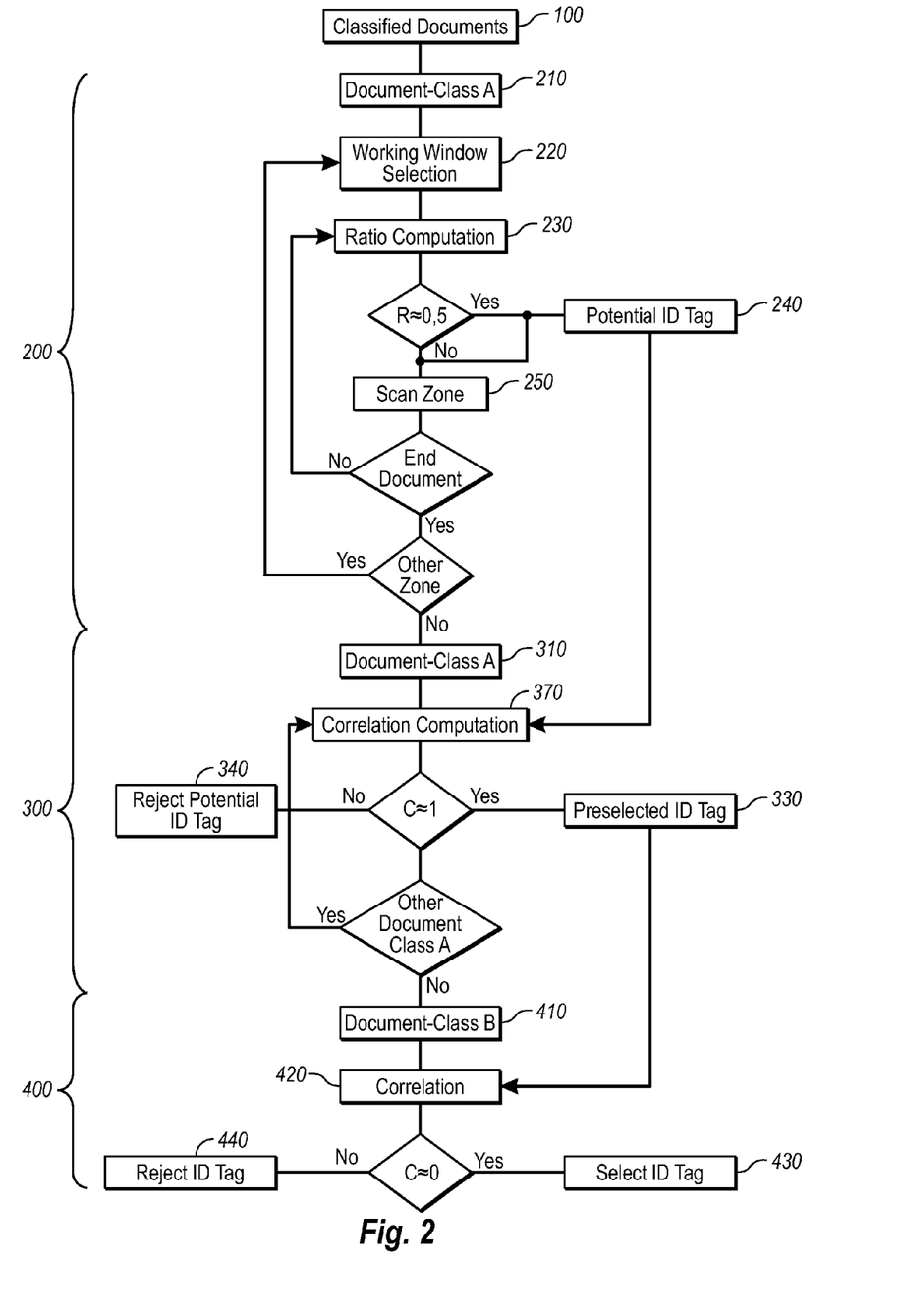
FIG. 2 is a flowchart of the method for automatically creating a model of documents according to the invention.

FIG. 2 illustrates a flow chart of the method for automatically creating a model of documents according to the invention.

The creation of models of documents is conducted starting from a plurality of classified documents. The object of the method according to the invention is to define a model for each class of the classification, such model being suitable for later use to classify subsequent documents.

The plurality of classified documents are organised in a set of different classes, each class being representative of a given type of document, according to the definitions given previously. The classified documents may come from any classifier using any known method of classification. The classified documents may be composed of a sample of at least one document, but preferably at least 2 documents per class to initiate the method for automatically creating a model according to the invention. The more documents we use to create a model of documents, the better the identifying tags will be representative of the class of these documents.

Referring to FIG. 2, the first step 100 of the method according to the invention is to provide a plurality of classified documents belonging to different classes.

A second series of steps 200 is to determine at least one potential identifying tag within one document belonging to one class.

One document is picked up (step 210) from one class A. A working window is selected (step 220) in said one document. The working window can be set with a predetermined size S1, for instance 10*10 pixels, which may possibly correspond to some relevant part of a company logo, name or address. The size of the working window should be big enough to contain relevant information and small enough to avoid slowing down processing. The working window is first located on a predetermined portion of document, for instance, upper left corner.

A ratio is then calculated (step 230) over said working window, representing the object surface divided by the window surface. For instance, pixels of the background (possibly white) are assigned a 0 value and the pixels representing patterns, letters or any other sign appearing on the background, for instance black letters and colour signs, are assigned the value 1.

When the calculated ratio is substantially equal to 0,5; or when the value ratio—0,5 is minimized, this constitutes an indication that some information is located within the region where the working window is located. Such a region is then selected to be a potential identifying tag (step 240) with specific content data D, size S and position (x, y).

The working window is shifted to scan (step 250) the document to search for different identifying tags, by repeating the step of ratio computation on different portions of the document. A portion of the document may be excluded from the scan to prevent the selection of a tag that is known to be of no interest in the classification. For instance, a bottom line to prevent selection of useless information of an endpaper page, or a region contiguous to an already selected potential tag.

A subsequent scan can be eventually conducted with another working window having a different size S2. Therefore, a plurality of potential identifying tags 1, 2 can be selected for one document, each tag having a specific content, i.e. data D1, D2, a specific size, S1, S2 and a specific position within the document (x1, y1), (x2, y2).

After potential identifying tags have been selected in a first document according to the series of steps 200, a further series of steps 300 is performed to check whether each said potential identifying tag is representative of most documents of the class A.

Another document, from the same class A as said first document, is picked up (step 310). The region corresponding to the position and size of a potential identifying tag is selected on said other document and a correlation function is computed (step 320) between the potential identifying tag data D and the data of said other document region.

The correlation computation can be expressed for each tag of a model of documents as:

$$C_{tag}=1-(P_{ij}-P'_{ij}/nm);$$

With n: number of x coordinates pixels
m: number of y coordinates pixels
i: incrementation up to value n
j: incrementation up to value m
$P_{ij}$: pixel data of the potential identifying tag $P'_{ij}$: pixel data of the corresponding region in the other document The correlation function therefore expresses the similarity between the potential identifying tag and the corresponding region in another document of the same class. If $C_{tag}$ is substantially equal to 1, the similarity is high and the potential tag can be considered as being representative of the class A and preselected (step 330). If not, the potential identifying tag must be rejected (step 340) as not being representative of the class.

The correlation may be refined by computing the function with slight shifts of pixels p' in both coordinate directions x, y and retaining the maximum value. A potential identifying tag may be present on another document with a small shift and must be detected anyway.

Such correlation can be conducted for some or each potential tag selected in the first document of the first class and for some or each other document of the same class A.

It will be understood that the routine can be stopped as soon as one match misses. In other words, as soon as one potential identifying tag selected in the first document does not match with one other document of the same class A, said potential identifying tag is rejected (step 340). In one embodiment, the routine can also be stopped as soon as one potential tag is included in one other document of the same class.

If the potential identifying tag matches with at least one other document of class A, said tag can be preselected (step 330). According to embodiments, the check of the potential identifying tag matching with other documents of class A can be conducted on some documents or on all documents of said class A. If class A only contains one document, all potential tags identified at step 240 will be preselected (step 330).

When an identifying tag is preselected after the series of steps 300, a further series of steps 400 can be conducted to check whether said preselected tag does not match with the documents of other classes, that is, to verify that said preselected tag is discriminant vis-à-vis other classes.

A document of a different class B is picked up (step 410) and a correlation function is computed (step 420) based on the same mathematical expression as set before. If $C_{tag}$ is then substantially equal to 0, the similarity between the preselected identifying tag and a corresponding region of the document of class B is low and said identifying tag can be considered as being discriminant over class B.

Such discrimination control can be conducted over all other classes of documents or stopped as soon as one class B is not represented by said preselected tag.

At least one preselected identifying tags that has not been found in another document of another class is then selected (step 430) as being an identifying tag representing class A otherwise the preselected identifying tag is rejected (step 440). A model of documents 10 can further be created including said at least one selected identifying tags (1, 2) to represent class A.

It must be understood that the steps of selecting potential identifying tags 200 can be mixed with the steps of preselection 300 and selection 400 of an identifying tag. That is to say, when a potential identifying tag is found in one document 8 of one class A, the steps of searching for said identifying tag in other documents of the same class A and checking that said identifying tag does not match with another document of another class B, can be conducted before another potential identifying tag is found in first document 8.

All the steps of the method for automatically creating a model of documents, as shown in FIG. 2, can be software implemented.

The invention therefore refers to a computer system for creating a model of documents representing a class of documents comprising computer-implemented means for accessing a plurality of documents separated into different classes; for determining at least one potential identifying tag within one document belonging to one class; for checking whether said potential identifying tag is included within at least a document of said one class; for selecting said identifying tag as representing said one class if previous checking is positive; for rejecting said potential identifying tag if previous checking is negative; for creating a model of documents related to said one class including said selected identifying tag.

The computer system may also include computer-implemented means for checking whether said identifying tag is included within at least a document of another class; for selecting said identifying tag as representing said one class if previous checking is negative; for rejecting said preselected identifying tag if previous checking is positive.

The models of documents according to the invention are automatically created with no need for an operator to intervene in the process.

Applicant has run a software according to the method of the invention to create 223 classes starting from an image database of 5 000 digitalized invoices. Each class includes about 20 documents. This software was run with a Pentium 4 to 2 Giga Hertz and took about 1 h 30 to create the models.

According to the invention, a set of models of documents is created respectively representing different classes.

Subsequently, when a document to be classified comes in, the models of documents can be used to classify said document, which means to assign a class to said document or to reject said document if not belonging to any known classes. The invention concerns therefore also a method for automatically classifying a document.

Figure 3:
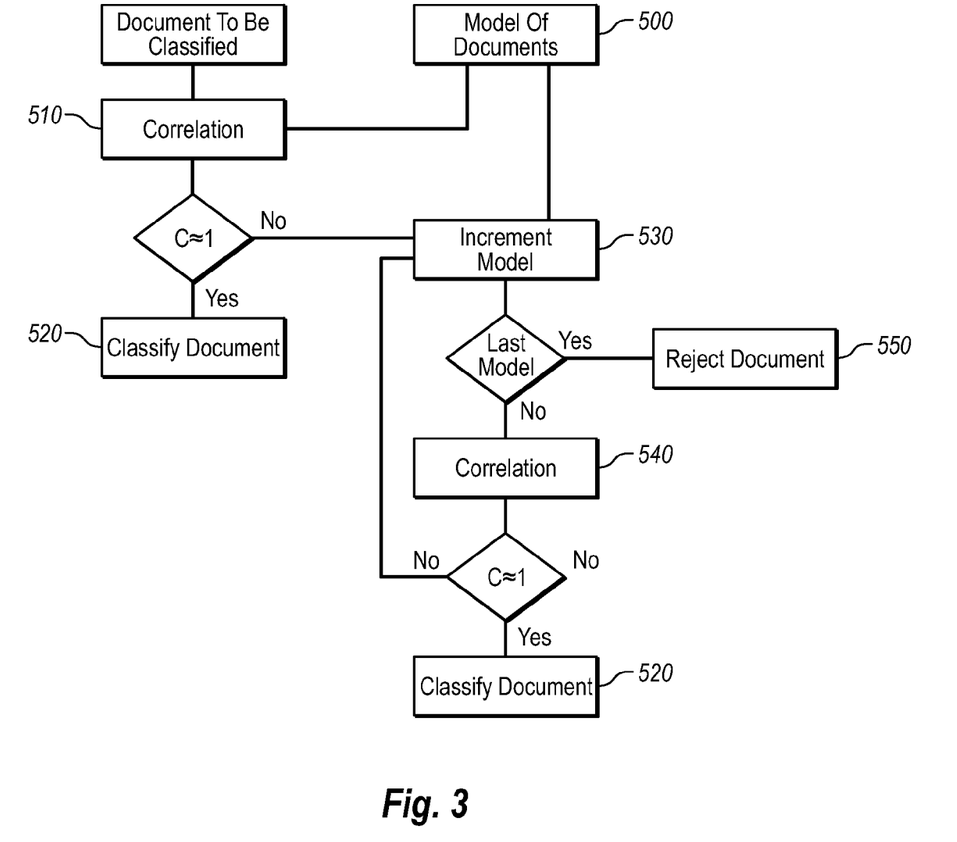
FIG. 3 is a flowchart of the method for automatically classifying a document according to the invention.

FIG. 3 is a flow chart illustrating the classification method according to the invention.

There is provided a plurality of models of documents according to the invention (step 500), each model of documents being related to a class.

The document to be classified is compared with a first model of documents referring to a first class A.

At least one region of the document to be classified is selected, said region corresponding to the size and location of at least one identifying tag of said first model of documents. A correlation function is computed (step 510) between said at least one identifying tag and said region of the document to be classified.

The correlation function between the document to be classified and the model of a given class is based on the following expression:

$$C_{class} = (C_{tag})/N_{tag}$$

With $C_{tag}$: the correlation between a tag of the model of documents and a corresponding region of the document to be classified based on the expression set before, and $N_{tag}$: the number of tags of the model of documents. $N_{tag}$ can be equal or set to 1 according to one embodiment.

If $C_{class}$ is substantially equal to 1, said document matches with said model of documents and can be assigned to the corresponding class (step 520). If $C_{class}$ is substantially equal to 0, said document does not match with said model of documents.

A subsequent model of documents of another class is picked up (step 530) and the correlation $C_{class}$ is calculated (step 540) for said other class.

According to embodiments, the correlation $C_{class}$ can be computed for all defined classes and the document to be classified will be assigned to the class for which $C_{class}$ has the closest value to 1; or the routine will be stopped as soon as one computed value of $C_{class}$ exceeds a threshold value.

If said document to be classified does not match with any model of documents, that is to say if $C_{class}$ is smaller than a threshold value substantially close to 0 for all models of documents, said document must be rejected (step 550) as not being suitable for classification according to the method.

All the steps of the method for automatically classifying a document, as shown in FIG. 3, can be software implemented.

The invention therefore refers to a computer system for classifying a document comprising computer-implemented software means for providing a plurality of models of documents, each model of documents being related to a class; for comparing a document to be classified with one model of documents; for assigning said document to a given class, when said document matches with the corresponding one model of documents; for rejecting said document to be classified, if said document to be classified does not match with any model of documents.

The classification method according to the invention increases the rate of automatic document image processing. The document to be classified is solely compared with models of documents by computing data over specific regions of document images corresponding to tags location.

Applicant has run a software according to the method of the invention to classify a document using 223 models created according to the method of the invention. This software was run using a Pentium 4 to 2 Giga Hertz and it took about 66,6 ms to assign a document to a given class (classification rate is about 15 image documents per second).

Specific Embodiments Of A Model of Documents And Method For Automatically Classifying A Document according to the present invention have been described for the purpose of illustrating the manner in which the invention may be made and used. It should be understood that implementation of other variations and modifications of the invention is not limited by the specific embodiments described. It is therefore contemplated to cover by the present invention any and all modifications, variations, or equivalents that fall within the true sprit and scope of the basic underlying principles disclosed and claimed herein.

The invention claimed is:

1. A method for automatically creating a model of documents representing a class of documents, the method comprising the steps of:
    a) providing a plurality of documents separated into different classes and selecting a first document from the plurality of documents, the first document belonging to a first class;
    b) determining at least one potential identifying tag within the first document, said identifying tag being defined by at least a graphical content, a size and a location within the first document
    c) correlating the at least one potential identifying tag within the first document with at least one potential identifying tag from a second document of the same first class as the first document, the second document selected from the plurality of documents; and
    d) creating a model of documents related to the first class, wherein the model includes the at least one potential identifying tag within the first document having a correlation that is representative of the first class.

2. The method according to claim 1, further comprising the steps of:
    e) checking whether the at least one potential identifying tag within the first document is included within at least a document of another class; and
    f) rejecting the at least one potential identifying tag within the first document and repeating steps b) and c).

3. The method according to claim 2, wherein steps b) to f) are repeated for each class of documents provided in step a).

4. The method according to claim 3, wherein step b) comprises the steps of:
    b1) selecting a working window in the first document;
    b2) calculating an object to surface ratio for said working window;
    b3) if said ratio lies within predetermined values, selecting the region of said working window as a potential identifying tag.

5. The method according to claim 4, wherein steps b1) to b3) are repeated by shifting the working window to scan the first document.

6. The method according to claim 2, wherein steps c) and e) comprise the step of calculating a correlation function between the at least one potential identifying tag within the first document and a region of said second document corresponding to the size and location of the at least one potential identifying tag within the first document.

7. The method according to claim 1, wherein a given portion of the first document is excluded from the searching of an identifying tag.

8. The method according to claim 1 for automatically classifying a document comprising the steps of:
    a') providing a plurality of models of documents, each model of documents being related to a different class;
    b') comparing a document to be classified with at least one model of documents; and
    c') assigning said document to be classified into a corresponding class when said document to be classified matches said one model of documents.

9. The method according to claim 8, wherein step b') includes the step of calculating a correlation function between at least one identifying tag of the model of documents and a region of the document to be classified corresponding to the size and location of said identifying tag.

10. The method according to claim 9, wherein step c') includes the steps of:
    comparing the correlation function results for each model of documents provided at step a'); and
    assigning the document to be classified to the class corresponding to the model of documents providing the correlation result closest to a predetermined value.

11. A computer system for creating a model of documents representing a class of documents comprising:
    computer-implemented software means for accessing a plurality of documents separated into different classes
    computer-implemented software means for determining at least one potential identifying tag within a first document belonging to a first class, said identifying tag being defined at least by a graphical content, a size and a location within the document;
    computer-implemented software means for correlating the at least one potential identifying tag with a second document of the first class; and
    computer-implemented software means for creating a model of documents related to said first class, the model including said selected identifying tag.

12. The computer system according to claim 11, further comprising:
    computer-implemented software means for checking whether said potential identifying tag is included within at least a document of another class; and
    computer-implemented software for rejecting said preselected identifying tag when said potential identifying tag is included within the document of another class.

* * * * *

UNITED STATES PATENT AND TRADEMARK OFFICE
CERTIFICATE OF CORRECTION

| | | |
|---|---|---|
| PATENT NO. | : 7,370,059 B2 | Page 1 of 3 |
| APPLICATION NO. | : 10/852969 | |
| DATED | : May 6, 2008 | |
| INVENTOR(S) | : Thierry Geraud | |

It is certified that error appears in the above-identified patent and that said Letters Patent is hereby corrected as shown below:

Drawings
Figure 2, replace the figure with the figure herein depicted wherein the reference correlation computation 370 has been changed to correlation computation 320.

Fig. 2

UNITED STATES PATENT AND TRADEMARK OFFICE
CERTIFICATE OF CORRECTION

| | |
|---|---|
| PATENT NO. | : 7,370,059 B2 |
| APPLICATION NO. | : 10/852969 |
| DATED | : May 6, 2008 |
| INVENTOR(S) | : Thierry Geraud |

It is certified that error appears in the above-identified patent and that said Letters Patent is hereby corrected as shown below:

Figure 3, replace the figure with the figure herein depicted wherein the rightmost No next to C ≈ 1 between Correlation 540 and Classify Document 520 has been removed for clarity.

Fig. 3

UNITED STATES PATENT AND TRADEMARK OFFICE
CERTIFICATE OF CORRECTION

PATENT NO. : 7,370,059 B2
APPLICATION NO. : 10/852969
DATED : May 6, 2008
INVENTOR(S) : Thierry Geraud It is certified that error appears in the above-identified patent and that said Letters Patent is hereby corrected as shown below:

<u>Column 1</u>
Line 12-13, change "invoice, fax cover sheet" to --invoices, fax cover sheets--.

<u>Column 4</u>
Line 56, change "equal to 0,5;" to --equal to 0.5;--.
Line 57, change "ratio – 0,5" to --ratio - 0.5--.

<u>Column 5</u>
Line 23, change "$c_{tag} - 1 - (P_{ij} - P'_{ij} /nm);$" to --$c_{tag} = 1 - (P_{ij} - P'_{ij} /nm);$--.
Line 57, change "to embodiments" to --to the embodiments--.

<u>Column 6</u>
Line 11, change "identifying tags" to --identifying tag--.
Line 53, change "run a software" to --run software--.

<u>Column 7</u>
Line 58, change "run a software" to --run software--.
Line 62, change "66,6" to --66.6--.

Signed and Sealed this

Twenty-first Day of April, 2009

JOHN DOLL
*Acting Director of the United States Patent and Trademark Office*